United States Patent
Weiland et al.

(10) Patent No.: US 12,405,351 B2
(45) Date of Patent: Sep. 2, 2025

(54) ADAPTIVE Tx-Rx CROSSTALK CANCELLATION FOR RADAR SYSTEMS

(71) Applicant: Infineon Technologies AG, Neubiberg (DE)

(72) Inventors: Lorenz Ferdinand Wilhelm Weiland, Munich (DE); Rodrigo Perez Gonzalez, Munich (DE)

(73) Assignee: Infineon Technologies AG, Neubiberg (DE)

( * ) Notice: Subject to any disclaimer, the term of this patent is extended or adjusted under 35 U.S.C. 154(b) by 516 days.

(21) Appl. No.: 17/705,034

(22) Filed: Mar. 25, 2022

(65) Prior Publication Data

US 2023/0305101 A1  Sep. 28, 2023

(51) Int. Cl.
*G01S 7/03* (2006.01)
*G01S 7/35* (2006.01)
*G01S 13/34* (2006.01)

(52) U.S. Cl.
CPC .............. *G01S 7/038* (2013.01); *G01S 7/354* (2013.01); *G01S 13/343* (2013.01)

(58) Field of Classification Search
CPC ......... G01S 7/038; G01S 7/354; G01S 13/343
See application file for complete search history.

(56) References Cited

U.S. PATENT DOCUMENTS

| | | |
|---|---|---|
| 4,241,347 A | 12/1980 | Albanese et al. |
| 6,147,572 A | 11/2000 | Kaminski et al. |
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Will, Christoph et al., "Advanced Template Matching Algorithm for Instantaneous Heartbeat Detection using Continuous Wave Radar Systems", ResearchGate, May 2017, 5 pages.

(Continued)

*Primary Examiner* — Vladimir Magloire
*Assistant Examiner* — Nazra Nur Waheed
(74) *Attorney, Agent, or Firm* — Slater Matsil, LLP

(57) ABSTRACT

In an embodiment, a method includes: initializing a crosstalk compensation factor indicative of a transmitter-receiver crosstalk between a transmit path of a radar sensor and a receive path of the radar sensor; receiving radar data from the radar sensor; selecting a set of data from the radar data; performing target detection on the set of data; and after performing the target detection on the set of data, when no target is detected in the set of data, updating the crosstalk compensation factor based on the set of data and, after updating the crosstalk compensation factor, generating a radar spectrum based on the radar data and the crosstalk compensation factor, and when a target is detected in the set of data, generating the radar spectrum based on the radar data and the crosstalk compensation factor without updating the crosstalk compensation factor.

26 Claims, 6 Drawing Sheets

(56) References Cited

U.S. PATENT DOCUMENTS

| | | |
|---|---|---|
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,229,102 B1 | 1/2016 | Wright et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,795,012 B2 | 10/2020 | Santra et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0028219 A1* | 2/2007 | Miller ............... G05B 23/0275 717/124 |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0146865 A1 | 6/2009 | Watanabe et al. |
| 2009/0153428 A1 | 6/2009 | Rofougaran et al. |
| 2009/0262005 A1 | 10/2009 | McNeill et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Wanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Kram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2020/0191911 A1* | 6/2020 | Meissner ............... G01S 13/343 |
| 2020/0217926 A1 | 7/2020 | Pietsch et al. |
| 2020/0264272 A1* | 8/2020 | Visweswaran ......... H01Q 1/525 |
| 2022/0350010 A1* | 11/2022 | Sagi ..................... G01S 13/04 |
| 2023/0139751 A1* | 5/2023 | Sanderovich ........... G01S 13/89 382/103 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

(56) References Cited

FOREIGN PATENT DOCUMENTS

OTHER PUBLICATIONS

Will, Christoph et al., "Human Target Detection, Tracking, and Classification Using 24-GHz FMCW Radar", IEEE Sensors Journal, vol. 19, No. 17, Sep. 1, 2019, pp. 7283-7299.
Will, Christoph et al., "Local Pulse Wave Detection using Continuous Wave Radar Systems", IEEE Journal of Electromagnetics, RF and Microwaves in Medicine and Biology, Oct. 25, 2017, 9 pages.
Will, Christoph et al., "Radar-Based Heart Sound Detection", Scientific Reports, www.nature.com/scientificreports, Jul. 26, 2018, 15 pages.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.
"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Dham, Vivek "Programming Chirp Parameters in TI Radar Devices," Application Report SWRA553, Texas Instruments, May 2017, 15 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Gigie, Andrew et al., "Novel Approach for Vibration Detection Using Indented Radar", Progess in Electromagnetic Research C, vol. 87, pp. 147-162, Oct. 4, 2018.
Gouveia, Carolina et al., "A Review on Methods for Random Motion Detection and Compensation in Bio-Radar Systems", Sensors, MDPI, Jan. 31, 2019, 17 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Gu, Changzhan et al., "Deep Neural Network based Body Movement Cancellation for Doppler Radar Vital Sign Detection", IEEE MTT-S International Wireless Symposium (IWS) May 19-22, 2019, 3 pages.
Gu, Changzhu "Short-Range Noncontact Sensors for Healthcare and Other Emerging Applications: A Review", Sensors, MDPI, Jul. 26, 2016, 24 pages.
Gu, Changzhan et al., "From Tumor Targeting to Speed Monitoring", IEEE Microwave Magazine, ResearchGate, Jun. 2014, 11 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.
Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Killedar, Abdulraheem "XWR1xxx Power Management Optimizations—Low Cost LC Filter Solution," Application Report SWRA577, Texas Instruments, Oct. 2017, 19 pages.
Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.
Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.
Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.
Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.
Li, Changzhi "Vital-sign monitoring on the go", Sensors news and views, www.nature.com/naturelectronics, Nature Electronics, vol. 2, Jun. 2019, 2 pages.
Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/$40064-015-1583-5; Jan. 2016, 16 pages.
Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.
Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.
Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.
Mostov, K., et al., "Medical applications of shortwave FM radar: Remote monitoring of cardiac and respiratory motion", Am. Assoc. Phys. Med., 37(3), Mar. 2010, pp. 1332-1338.

(56) References Cited

OTHER PUBLICATIONS

Oguntala, G et al., "Indoor location identification technologies for real-time IoT-based applications: an inclusive survey", Elsevier Inc., http://hdl.handle.net/10454/16634, Oct. 2018, 21 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

Santra, Avik et al., "Short-range multi-mode continuous-wave radar for vital sign measurement and imaging", ResearchGate, Conference Paper, Apr. 2018, 6 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Suleymanov, Suleyman, "Design and Implementation of an FMCW Radar Signal Processing Module for Automotive Applications," Master Thesis, University of Twente, Aug. 31, 2016, 64 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T et al., "Intelligent target recognition using micro-Doppler radar signatures," Defence R&D Canada, Radar Sensor Technology III, Proc. of SPIE, vol. 7308, 730817, Dec. 9, 2009, 11 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, 1974, pp. 18-34.

\* cited by examiner

ADAPTIVE Tx-Rx CROSSTALK CANCELLATION FOR RADAR SYSTEMS

TECHNICAL FIELD

The present disclosure relates generally to an electronic system and method, and, in particular embodiments, to adaptive transmitter-receiver crosstalk cancellation for radar systems.

BACKGROUND

Applications in the millimeter-wave frequency regime have gained significant interest in the past few years due to the rapid advancement in low-cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

Crosstalk from the transmit path of a radar to the receive path of the radar may occur, e.g., when a portion of the transmitted signal is received by the receive path via an internal path of the radar. Such crosstalk is commonly referred to as TX-RX crosstalk or TX-RX leakage. A standard approach to cope with this crosstalk is to use high-pass filters (HPFs). Another approach uses a moving target indication (MTI) in applications with moving targets.

SUMMARY

In accordance with an embodiment, a method includes: initializing a crosstalk compensation factor indicative of a transmitter-receiver crosstalk between a transmit path of a radar sensor and a receive path of the radar sensor; receiving radar data from the radar sensor; selecting a set of data from the radar data; performing target detection on the set of data; and after performing the target detection on the set of data, when no target is detected in the set of data, updating the crosstalk compensation factor based on the set of data and, after updating the crosstalk compensation factor, generating a radar spectrum based on the radar data and the crosstalk compensation factor, and when a target is detected in the set of data, generating the radar spectrum based on the radar data and the crosstalk compensation factor without updating the crosstalk compensation factor.

In accordance with an embodiment, a radar system includes: a radar sensor configured to transmit radar signals via a transmit path, receive reflected radar signals via a receive path, and provide radar data based on an output of the receive path; and a processing system configured to: initialize a crosstalk compensation factor indicative of a transmitter-receiver crosstalk between the transmit path and the receive path, select a set of data from the radar data, perform target detection on the set of data, and after performing the target detection on the set of data, when no target is detected in the set of data, update the crosstalk compensation factor based on the set of data and, after updating the crosstalk compensation factor, generate a radar spectrum based on the radar data and the crosstalk compensation factor, and when a target is detected in the set of data, generate the radar spectrum based on the radar data and the crosstalk compensation factor without updating the crosstalk compensation factor.

In accordance with an embodiment, a method includes: initializing a crosstalk compensation factor indicative of a transmitter-receiver crosstalk between the a transmit path of a millimeter-wave radar sensor and a receive path of the millimeter-wave radar sensor; receiving radar data from the millimeter-wave radar sensor; selecting a sub-set of data from the radar data; determining a polynomial fit on the sub-set of data; determining a residual of the polynomial fit based on the polynomial fit and the sub-set of data; and determining a spectrum of the residual of the polynomial fit; incoherently integrating a first L bins of the spectrum of the residual of the polynomial fit to generate an integrated spectrum, L being a positive integer greater than 1 and lower than a maximum number of bins of the spectrum of the residual of the polynomial fit; performing target detection on the sub-set of data based on the integrated spectrum; after performing the target detection on the sub-set of data, when no target is detected in the sub-set of data, updating the crosstalk compensation factor based on the sub-set of data and, after updating the crosstalk compensation factor, generating a radar spectrum based on the radar data and the crosstalk compensation factor, and when a target is detected in the sub-set of data, generating the radar spectrum based on the radar data and the crosstalk compensation factor without updating the crosstalk compensation factor; and performing target detection or target tracking based on the radar spectrum.

In accordance with an embodiment, a method includes: receiving radar data from a radar sensor; selecting a set of data from the radar data; determining a crosstalk approximation to a transmitter-receiver crosstalk between a transmit path of the radar sensor and a receive path of the radar sensor based on the set of data; determining a residual of the crosstalk approximation based on the crosstalk approximation and the set of data; determining a spectrum of the residual of the crosstalk approximation; and performing target detection on the set of data based on the spectrum of the residual of the crosstalk approximation.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., an adaptive TX-RX crosstalk cancellation for millimeter-wave radars operated as a frequency-modulated continuous wave (FMCW) radar. Embodiments of the present invention may be used with other types of radars systems, such as radars operating outside the millimeter-wave range.

In an embodiment of the present invention, a millimeter-wave radar adaptively cancels the effect of crosstalk from the transmit path to the receive path on a radar spectrum based on whether close-range targets are detected. A set of radar data is selected from a set of radar data. If no close-range targets are detected in the set of radar data, a crosstalk compensation factor is updated. If a close-range target is detected, the crosstalk compensation factor is not updated. The radar spectrum is compensated by cancelling the contribution of the crosstalk (e.g., in the time domain or in the frequency domain) based on the crosstalk compensation factor.

Figure 1:
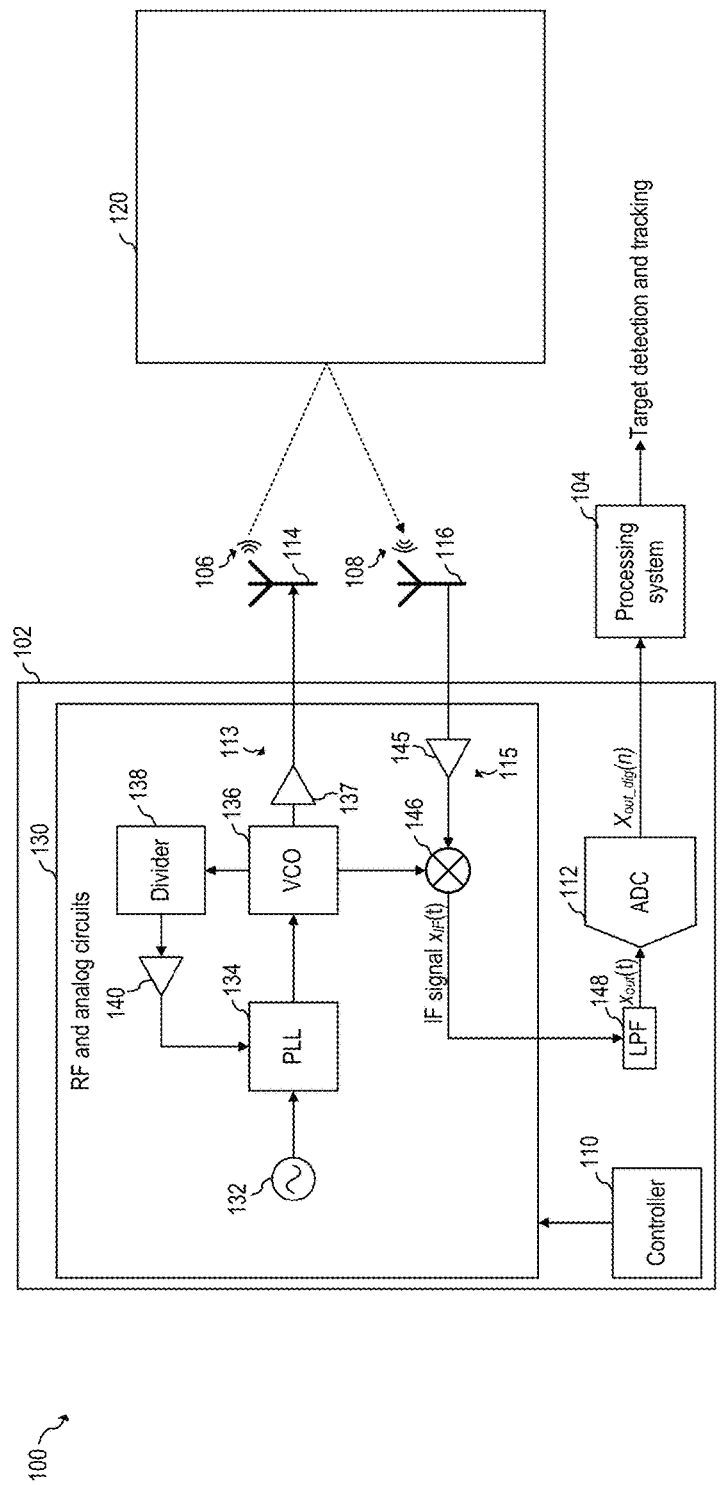
FIG. 1 shows a schematic diagram of a millimeter-wave radar system, according to an embodiment of the present invention.

FIG. 1 shows a schematic diagram of millimeter-wave radar system 100, according to an embodiment of the present invention. Millimeter-wave radar system 100 includes millimeter-wave radar sensor 102 and processing system 104.

In some embodiments, millimeter-wave radar sensor 102 may be used to generate radar data ($x_{out\_dig}(n)$) and processing system 104 may implement a radar processing chain, e.g., to detect, track, and/or classify targets.

During normal operation, millimeter-wave radar sensor 102 operates as a frequency-modulated continuous-wave (FMCW) radar sensor and transmits a plurality of radar signals 106, such as chirps, towards scene 120 using one or more transmitter (TX) antennas 114. The radar signals 106 are generated using RF and analog circuits 130. The radar signals 106 may be, e.g., in the 20 GHz to 122 GHz range. Other frequencies may also be used.

The objects in scene 120 may include one or more static or moving objects, such as cars, motorcycles, bicycles, trucks, and other vehicles, idle and moving humans and animals, poles, furniture, machinery, mechanical structures, walls and other types of structures. Other objects may also be present in scene 120.

The radar signals 106 are reflected by objects in scene 120. The reflected radar signals 108, which are also referred to as the echo signal, are received by one or more receiving (RX) antennas 116. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal $x_{out}(t)$.

The analog signal $x_{out}(t)$ is converted to raw digital data $x_{out\_dig}(n)$ (also referred to as radar data) using ADC 112. The raw digital data $x_{out\_dig}(n)$ is processed by processing system 104 to, e.g., detect, track, and/or classify targets.

Controller no controls one or more circuits of millimeter-wave radar sensor 102, such as RF and analog circuit 130 and/or ADC 112. Controller no may be implemented, e.g., as a custom digital or mixed signal circuit, for example. Controller no may also be implemented in other ways, such as using a custom or general purpose processor or controller configured to execute instructions stored in a memory. In some embodiments, processing system 104 implements a portion or all of controller no.

Processing system 104 may be implemented with a general purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general purpose microcontroller. In some embodiments, processing system 104 may be implemented with a plurality of processors and/or controllers. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. In some embodiments, millimeter-wave radar sensor 102 and processing system 104 are implemented in respective integrated circuits. In some embodiments, a plurality of integrated circuits is used to implement millimeter-wave radar sensor 102. In some embodiments, a plurality of integrated circuits is used to implement processing system 104. Other implementations are also possible.

As a non-limiting example, RF and analog circuits 130 may be implemented, e.g., as shown in FIG. 1. During normal operation, voltage-controlled oscillator (VCO) 136 generates radar signals, such as a linear frequency chirps (e.g., from 57 GHz to 64 GHz, or from 76 GHz to 77 GHz), which are transmitted by the transmitting antenna 114. The VCO 136 is controlled by PLL 134, which receives a reference clock signal (e.g., 80 MHz) from reference oscillator 132. PLL 134 is controlled by a loop that includes frequency divider 138 and amplifier 140. Amplifiers 137 may be used to drive transmitting antenna 114.

The TX radar signals 106 transmitted by transmitting antenna 114 are reflected by objects in scene 120 and received by receiving antenna 116. The echo received by receiving antenna 116 is mixed with a replica of the signal transmitted by transmitting antenna 114 using mixer 146 to produce intermediate frequency (IF) signal $x_{IF}(t)$ (also known as beat signal). In some embodiments, the beat signal $x_{IF}(t)$ has a bandwidth between 10 kHz and 1 MHz. Beat signals with a bandwidth lower than 10 kHz or higher than 1 MHz is also possible. Amplifier 145 may be used to receive the reflected radar signals from antenna 116.

Beat signal $x_{IF}(t)$ is filtered with low-pass filters (LPF) 148 and then sampled by ADC 112. ADC 112 is advantageously capable of sampling the filtered beat signal $x_{out}(t)$ with a sampling frequency that is much smaller than the frequency of the signal received by receiving antenna 116. Using FMCW radars, therefore, advantageously allows for a compact and low cost implementation of ADC 112, in some embodiments.

The raw digital data $x_{out\_dig}(n)$, which in some embodiments include the digitized version of the filtered beat signal $x_{out}(t)$ is (e.g., temporarily) stored, e.g., in matrices of $N_c \times N_s$ per receiving antenna 116, where $N_c$ is the number of chirps considered in a frame and $N_s$ is the number of samples per chirp, for further processing by processing system 104.

Figure 2:
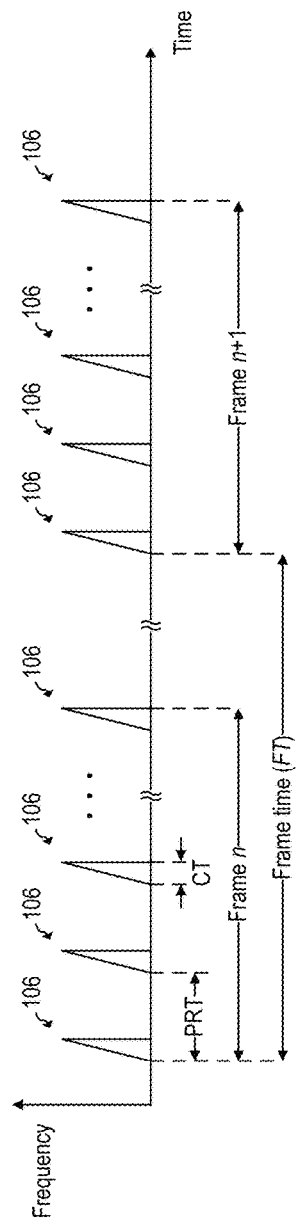
FIG. 2 shows a sequence of chirps transmitted by the radar system of FIG. 1, according to an embodiment of the present invention.

FIG. 2 shows a sequence of chirps 106 transmitted by TX antenna 114, according to an embodiment of the present invention. As shown by FIG. 2, chirps 106 are organized in a plurality of frames and may be implemented as up-chirps. Some embodiments may use down-chirps or a combination of up-chirps and down-chirps, such as up-down chirps and down-up chirps. Other waveform shapes may also be used.

As shown in FIG. 2, each frame may include a plurality of chirps 106. For example, in some embodiments, the number of chirps in a frame is 16. Some embodiments may include more than 16 chirps per frame, such as 20 chirps, 32 chirps, or more, or less than 16 chirps per frame, such as 10 chirps, 8 chirps, or less. In some embodiments, each frame includes only a single chirp.

In some embodiments, frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

The duration of the chirp (from start to finish) is generally referred to as chirp time (CT). In some embodiments, the chirp time may be, e.g., 64 µs. Higher chirp times, such as 128 µs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 902 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Figure 3:
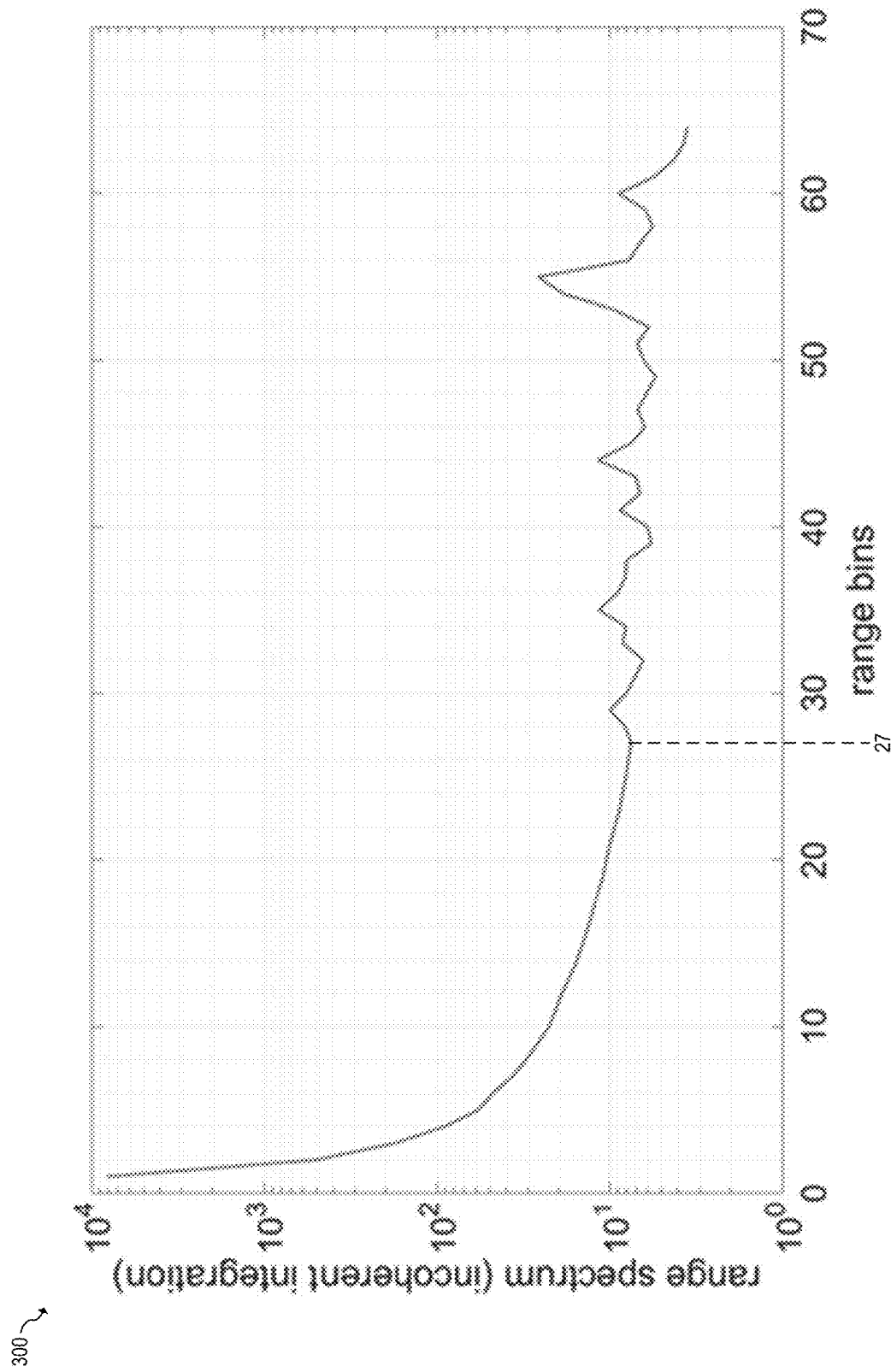
FIGS. 3 and 4 show exemplary range spectra associated with the millimeter-wave radar sensor of FIG. 1, according to embodiments of the present invention.

As signal transmission and reception is performed simultaneously, crosstalk may occur between transmit path 113 and receive path 115. Crosstalk from transmit path 113 to receive path 115 generally covers the lower part of the range spectrum with high amplitudes. For example, FIG. 3 shows exemplary range spectrum 300 associated with millimeter-wave radar sensor 102, according to an embodiment of the present invention. Range spectrum 300 is obtained from a fast Fourier transform (FFT) and non-coherent integration of all chirps and all channels of the radar data ($x_{out\_dig}(n)$) of a single frame with $N_S=128$, $N_c=16$, $N_R=8$ and BW=4 GHz, where $N_c$ is the number of chirps considered in a frame, $N_s$ is the number of samples per chirp, and $N_R$ is the number of receiving antennas 116, where scene 120 is empty (without any targets present) and with transmitting antenna(s) 114 and receiving antenna(s) 116 located at 1 meter from the floor.

As shown in FIG. 3, the first range bins (bin 27 and lower) of the range spectrum 300 are dominated by the TX-RX crosstalk. The low frequency components of the TX-RX crosstalk are caused by the direct transmission from the transmit path 113 to the receive path 115, which leads to a very small round-trip delay and thus a very small beat frequency of the beat signal $x_{IF}(t)$. The reflections that are present after range bin 27 are due to reflections from the ground, e.g. at approximately 1 meter distance due to the 1 meter height of the radar above the ground.

As illustrated in FIG. 3, the TX-RX crosstalk may be a dominant low-frequency component in the receive signal, which may be modelled as target with a spread function $g_0(\tau)$ with a bounded support on $[0, \tau_L]$ with $\tau_L \ll 1$ as the crosstalk covers the lower part of the spectrum only, where L correspond to the bin representing the highest bin associated with the TX-RX crosstalk (bin 27 in the example illustrated in FIG. 3), τ denoting the normalized beat frequency, where $\tau \in (0,1]$, and where τ=1 corresponds to the maximum unambiguous range.

Figure 4:
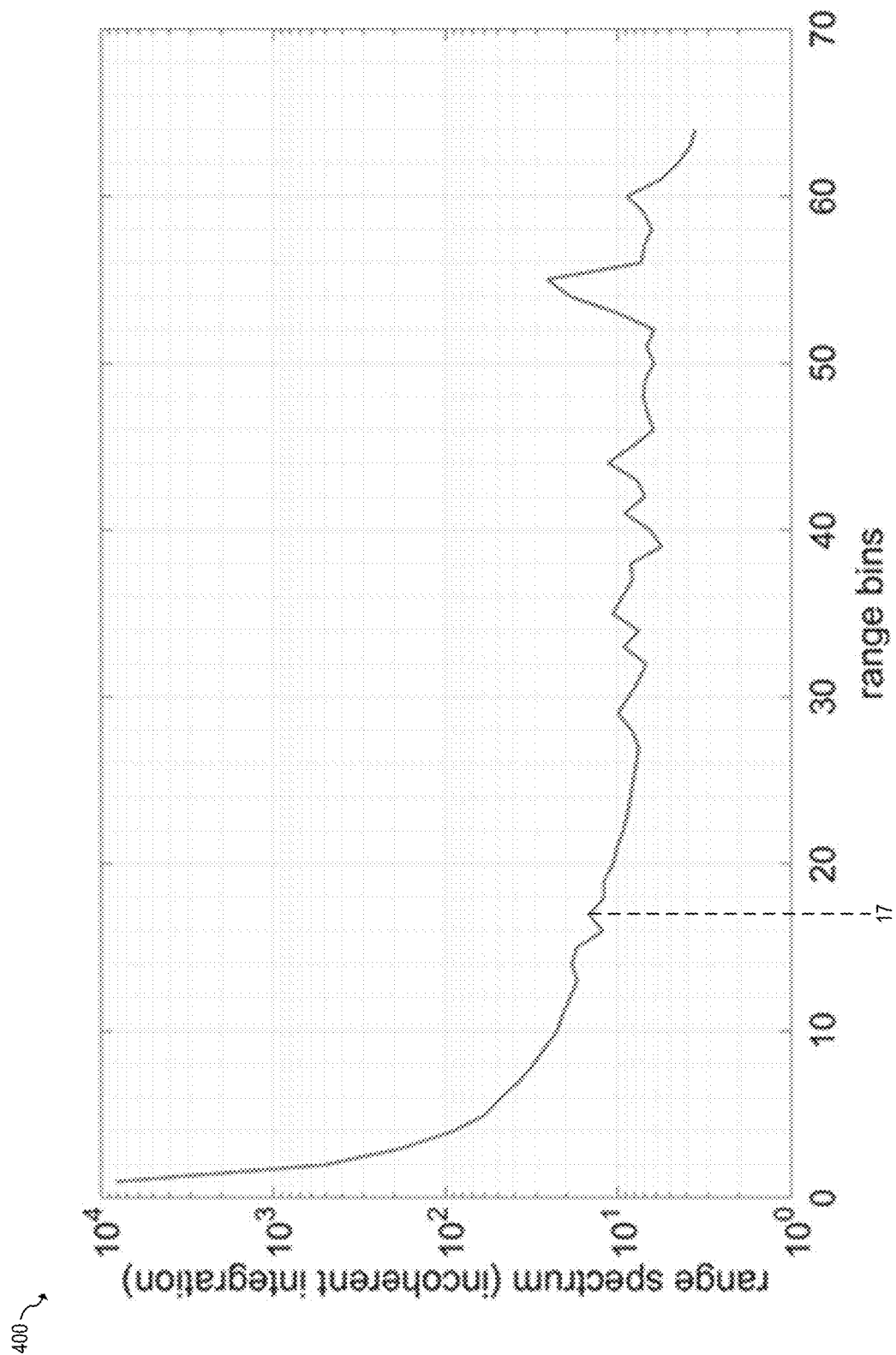

As illustrated in FIG. 3, the TX-RX crosstalk may cause the detection of static objects at close ranges to be extremely challenging. This is particularly the case if the targets have a comparably small radar cross-section (RCS). For example, FIG. 4 shows exemplary range spectrum 400 associated with millimeter-wave radar sensor 102, according to an embodiment of the present invention. Range spectrum 400 is obtained in a similar manner as range spectrum 300, except that scene 120 includes a plastic pole instead of an empty scene. As shown in FIG. 4, detecting the plastic pole target, which is located at a distance that corresponds to bin 17, may be difficult in the presence of the TX-RX crosstalk.

Figure 5:
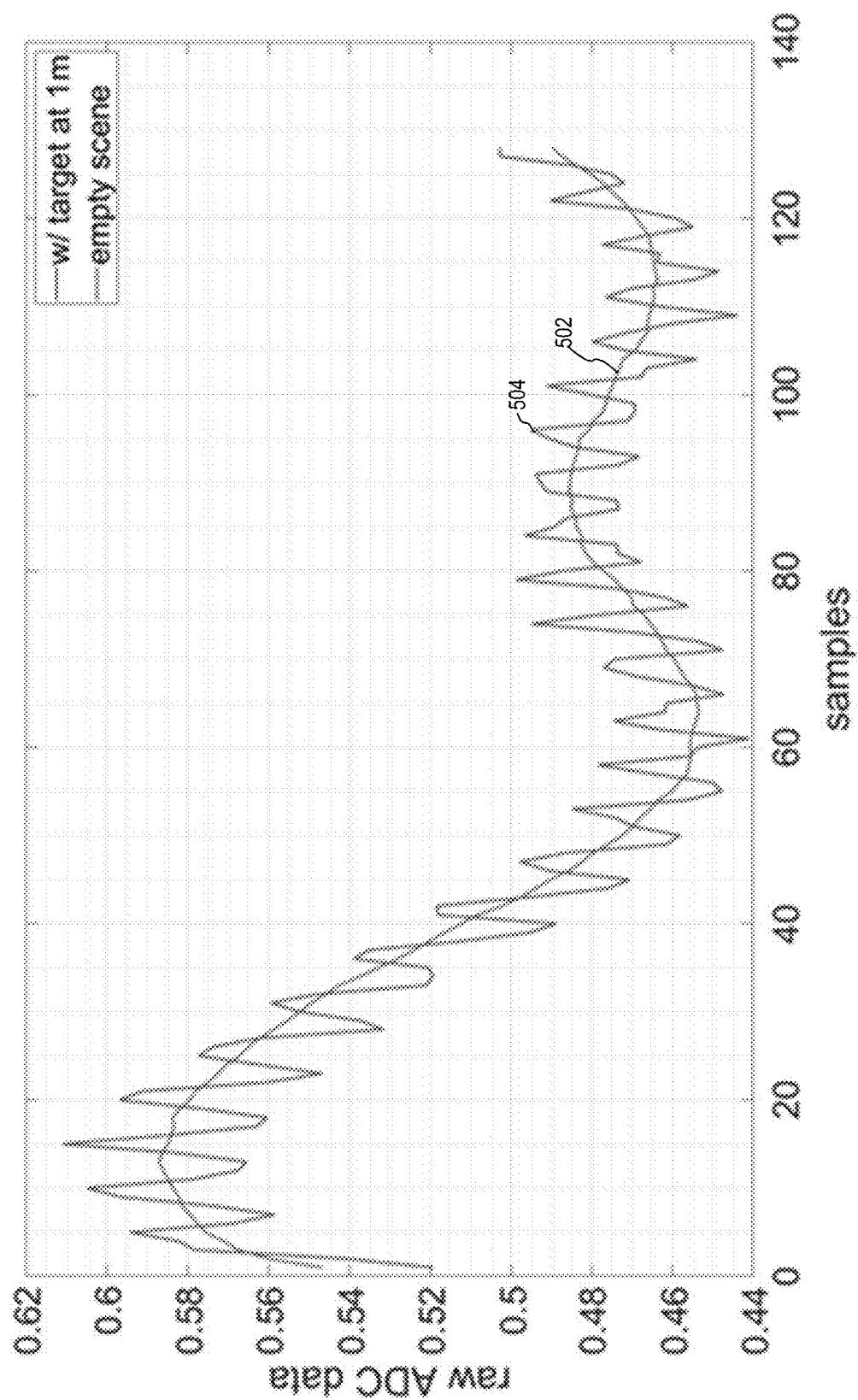
FIG. 5 shows waveforms of radar data, according to an embodiment of the present invention.

FIG. 5 shows waveforms 502 and 504 of radar data $x_{out\_dig}(n)$ associated with an empty scene, and with a scene with a target at 1 meter, respectively, according to an embodiment of the present invention.

As illustrated by curve 502 (and as also illustrated in FIG. 3), the contribution of the TX-RX crosstalk has a low frequency. As illustrated by curve 504 (and as also illustrated in FIG. 4), when a target at close-range is present (e.g., in the field-of-view of millimeter-wave radar sensor 102 and close to the millimeter-wave radar sensor, such as within 1 meter), the reflected signals (108) are superimposed with the TX-RX crosstalk.

Figure 6:
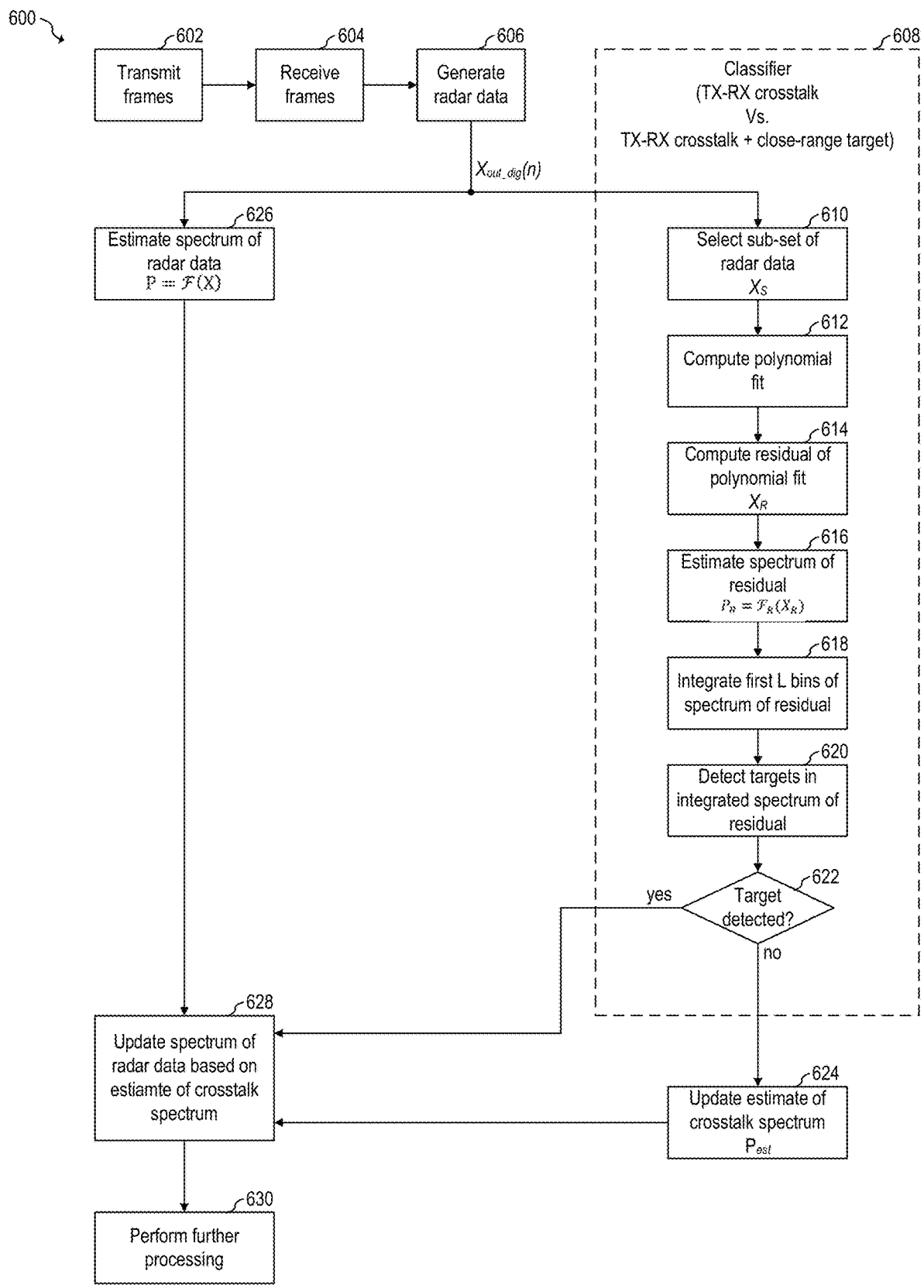
FIGS. 6 and 7 show flow charts of embodiment methods for dynamic crosstalk cancellation, according to an embodiment of the present invention.

As illustrated in FIGS. 3-5, it may be desirable to compensate for TX-RX crosstalk, e.g., before performing other radar processing tasks, such as target detection, tracking, and/or classification. FIG. 6 shows a flow chart of embodiment method 600 for dynamic TX-RX crosstalk cancellation, according to an embodiment of the present invention. Method 600 may be implemented by processing system 104.

During step 602, a millimeter-wave radar sensor (e.g., 102), transmits radar signals (e.g., 106) organized in frames using one or more transmitting antennas (e.g., 114).

During step 604, the millimeter-wave radar sensor receives signals using one or more receiving antennas (e.g., 116), which may include reflected radar signals (e.g., 108). The received signals may be organized in frames corresponding to the frames transmitted during step 602.

During step 606, raw digital data $x_{out\_dig}(n)$ is generated based on the received signals (which includes TX-RX crosstalk and may include reflected radar signals 108). For example, in some embodiments, during step 606, the transmitted and received signals are mixed (e.g., using mixer 146) to generate an IF signal $x_{IF}(t)$. The IF signal $x_{IF}(t)$ is then filtered (e.g., with a low-pass and/or band-pass filter) and digitized with an ADC (e.g., 112) to generate the radar data $x_{out\_dig}(n)$.

During step 610, a set $X_S$ of the radar data $x_{out\_dig}(n)$ is selected. For example, in some embodiments, the set $X_S$ of radar data $x_{out\_dig}(n)$ corresponds to a selection $\mathcal{S}$ of chirps with $|\mathcal{S}|=S\in\{1, \ldots, N_C N_R\}$ from radar data $x_{out\_dig}(n)$, where $X_S \in \mathbb{R}^{N_S \times S}$ denote the chirps corresponding to the selection $\mathcal{S}$ arranged in a matrix. In some embodiments, the set Xs includes all radar data $x_{out\_dig}(n)$ (the selection $\mathcal{S}$ of chirps includes all chirps in the radar data $x_{out\_dig}(n)$). In some embodiments, the set $X_S$ includes some, but not all, radar data $x_{out\_dig}(n)$.

During step 612, a crosstalk approximation of the TX-RX crosstalk is determined, e.g., by using a least-squares fit of a low-order polynomial performed on the set $X_S$ of radar data $x_{out\_dig}(n)$. As illustrated by curve 502, in some embodiments, such least-squares fit may represent a good approximation of the TX-RX crosstalk. In some embodiments, a polynomial of order lower than 10, such as 6, may be used.

For example, in some embodiments, the least-squares fit is performed for each column of $X_S$. For example, without loss of generality, letting the sampling times be $n=1,\ldots,N_S$, and considering a polynomial of degree d given as $$p_d(n;a)=\Sigma_{k=0}^{\bar{d}}a(k)n^k, \quad (1)$$

where $a=[a(0), \ldots, a(\bar{d})]\in \mathbb{R}^d$ with $d=\bar{d}+1$ and $a\in \mathbb{R}^d$ parameterizes the polynomial, where $$p_d(a)=[p_d(1;a), \ldots, p_d(N_S;a)]\in \mathbb{R}^{N_S} \quad (2)$$

and $$P_d(A)=[p_d(a_1), \ldots, p_d(a_S)]\in \mathbb{R}^{N_S \times S} \quad (3)$$

with $$A=[a_1, \ldots, a_S]\in \mathbb{R}^{d \times S} \quad (4)$$

the least-square problem may be given as $$\min_A \|X_S - P_d(A)\|_F, \quad (5)$$

where $\|\ \|_F$ represents the Frobenius norm. Letting the matrix $B\in \mathbb{R}^{N_S \times d}$ be a Vandermonde matrix with elements $B(i,j)=i^{j-1}$ such that $p_d(a)=Ba$ and $P_d(A)=BA$, the linear least-squares problem may be given as $$\min_A \|X_S - BA\|_F, \quad (6)$$

which as $B\in \mathbb{R}^{N_S \times d}$ has full rank has a unique optimizer if d $N_s$ given as $$A_{opt}=(B'B)^{-1}B'X_S \quad (7)$$

and a unique optimal value, where B' refers to the transpose of B if B is a real matrix and to the conjugate transpose (Hermitian) of B if B is a complex matrix. The fitted polynomials may be given as $$P_d(A_{opt})=B(B'B)^{-1}B'X_S=P_B X_S \quad (8)$$

and may be obtained by the orthogonal projection $P_B X_S$ of $X_S$ onto range(B).

During step 614, the computation of a residual of the estimation of the TX-RX crosstalk is performed (the computation of the residual of the crosstalk approximation performed during step 612). For example, in some embodiments, the residual of the polynomial fit (computed during step 612) is computed, e.g., by subtracting the polynomial fit from the set $X_S$. For example, in some embodiments, the residual $X_R$ may be computed as $$X_R=X_S-P_d(A_{opt})=P_B^\perp X_S, \quad (9)$$

which corresponds to the projection of $X_S$ onto $(\text{range}(B))^\perp$, where B'B as well as B' $X_S$ can be obtained in closed form.

As illustrated in FIG. 5, the residual $X_R$ may be indicative of the presence of close-range target. During step 616, a spectrum is determined based on residual $X_R$ using a spectral estimator. For example, in some embodiments, considering real-valued raw ADC data $X_S$ (although the approach may not be limited to real-valued raw ADC data and may be applied, e.g., to real and imaginary part of complex-valued ADC data), the range spectrum of $X_S$ is symmetric by construction and only one half of the range spectrum contains useful information. Thus, the spectral estimator may be defined as a function mapping from $\mathbb{R}^{N_S \times S}$ to $$\mathbb{C}^{\frac{q}{2}N_S \times S},$$

only, where the additional factor q accounts for spectral estimators which estimate the spectrum on, e.g., an oversampled FFT grid. For example, in some embodiments, the spectral estimator $\mathcal{F}_R$ (where $$\mathcal{F}_R: \mathbb{R}^{N_S \times S} \to \mathbb{C}^{\frac{q}{2}N_S \times S}, X_R \mapsto \mathcal{F}_R(X_R))$$

estimates the useful part of the range spectrum of $X_R$ using a spectral grid with $$\frac{q}{2}N_S$$

grid points and may generate the range spectrum using an FFT (with time-domain windowing) along the first dimension of $X_R$ and by considering the first half of the FFT spectrum only. In some embodiments, the spectra PR of the residual $X_R$ may be given by $$P_R = \mathcal{F}_R(X_R) \tag{10}$$

During step 618, the first L bins of the spectra $P_R$ of the residual $X_R$ are integrated. For example, in some embodiments, the first L bins of the range spectra $P_R$ of the residuum along all S is incoherently (non-coherently) integrated to obtain the spectrum $P_D \in \mathbb{R}^L$, which may be computed as $$P_D = (P_R(1:L,:) \odot P^*_R(1:L,:))1_{S \times 1} \in \mathbb{R}^L, \tag{11}$$

where $\odot$ denotes the element-wise Hadamard matrix product, $P_R^*$ denotes the complex conjugate of $P_R$, and $1_{S \times 1}$ denotes the all-ones vector of dimension S, and where $$L\left(0 < L \ll \frac{q}{2}N_S\right)$$

corresponds to the last range bin that is significantly affected by the TX-RX crosstalk.

In some embodiments, spectrum $P_D$ is indicative of whether a close-range target is present. During step 620, target detection is performed, e.g., using constant false alarm rate (CFAR). In some embodiments, the CFAR may be aborted after the first target is detected.

If no target is detected during step 622, a crosstalk compensation factor $P_{est}$ is updated during step 624 (where the crosstalk compensation factor $P_{est}$ may be previously initialized, e.g., to a default value). For example, let $P_{est} \in \mathbb{C}^{L \times N_C \times N_R}$ denote the current estimate of the TX-RX crosstalk spectrum (e.g., which is stored in a memory of processing system 104). In addition, let $$\mathcal{F}: \mathbb{R}^{N_S \times N_C \times N_R} \to \mathbb{C}^{\frac{q}{2}N_S \times N_C \times N_R}, X \mapsto \mathcal{F}(X)$$

denote a spectral estimator which estimates the range spectra of every chirp and receive channel in the radar data X of the current frame, the estimate of the spectrum of the TX-RX crosstalk may be updated according to an exponential moving average (EMA) given as $$P_{est} \leftarrow \alpha P_{est} (1-\alpha) P(1:L,:,:), \tag{12}$$

where $P(1:L,:,:)$ denotes the first L range bins of the estimated range spectra of the raw ADC data $x_{out\_dig}(n)$ (of $P = \mathcal{F}(X)$, where X represents the radar data $x_{out\_dig}(n)$) and $\alpha$ with $0 \le \alpha \le 1$ denotes the exponential weighting factor of the EMA, and where $\leftarrow$ is a symbol that implies that the operation to the right of the symbol $\leftarrow$ is performed first and then assigned to the variable to the left of the symbol $\leftarrow$. The updated crosstalk compensation factor $P_{est}$ may be stored (e.g., replacing the previous crosstalk compensation factor $P_{est}$) in (e.g., volatile or non-volatile) memory (e.g., of processing system 104).

If a target is detected during step 622, step 624 is skipped.

During step 626 (which may be performed before, during, or after steps 608 and 624 (if applicable)), the spectrum of the radar data is estimated. For example, in some embodiments, the spectrum P of the radar data $x_{out\_dig}(n)$ may be given as $$P = \mathcal{F}(X) \tag{13}$$

where $\mathcal{F}(\ )$ is the same spectral estimator used during step 616 and where X represents the radar data $x_{out\_dig}(n)$. In some embodiments, the spectral estimator $\mathcal{F}(\ )$ is a range FFT. In some embodiments, the spectral estimator $\mathcal{F}(\ )$ is a Capon estimator. Other estimators may also be used for performing steps 626 and 616.

During step 628, the spectrum generated during step 626 is compensated based on the stored crosstalk compensation factor $P_{est}$. For example, in some embodiments, the spectrum P generated during step 626 is compensated as $$P(1:L,:,:) \leftarrow P(1:L,:,:) - P_{est} \tag{14}$$

In some embodiments, L may be, e.g., $qN_S/2$. In some embodiments, the compensated spectrum generated during step 626 is advantageously not affected (or not substantially affected) by TX-RX crosstalk.

During step 630, the compensated spectrum P is used, e.g., to detect, track and/or classify targets in ways known in the art.

As shown in FIG. 6, step 608 (which includes 610, 612, 614, 616, 618, 620, and 622) operates as a classifier that classifies $X_S$ as including TX-RX crosstalk or including TX-RX crosstalk plus target(s). As also illustrated in FIG. 6, the crosstalk compensation factor $P_{est}$ (which is indicative of the TX-RX crosstalk between transmit path 113 and receive path 115) is updated (in step 624) only when no target is detected in the chirps of set $X_S$. By only updating the crosstalk compensation factor $P_{est}$ when no target is detected, some embodiments advantageously compensate for TX-RX crosstalk without including contributions from close-range target(s), increasing the performance of the crosstalk cancellation.

As shown in FIG. 6, in some embodiments, step 618 may be performed to generate an integrated spectrum of the residual by performing incoherent integration. In some embodiments, coherent integration may be performed instead (e.g., with an additional beamforming step). In some embodiments, step 618 may be omitted and step 620 may be performed in a non-integrated spectrum of the residual (e.g., generated during step 618).

In some embodiments, step 608 and step 624 (if applicable) are performed with the same rate as the frame rate of the radar data. By performing TX-RX crosstalk cancellation at the same rate as the frame rate, some embodiments advantageously adapt to new environments quickly. For example, in some embodiments, millimeter-wave radar sensor 102 may be implemented in a mobile device (such as a smartphone) and may move quickly, such as by rotating or displacing. A fast TX-RX crosstalk cancellation rate may advantageously allow for close-range target detection, which may improve the performance of, e.g., hand gesture recognition for operating the smartphone.

In some embodiments, step 608 and step 624 (if applicable) are performed with rate slower than the frame rate of the radar data (such as 10 times slower or 100 times slower). By performing TX-RX crosstalk cancellation at a rate slower than the frame rate, some embodiments advantageously save computational power. For example, in some embodiments, the environment influencing the TX-RX crosstalk may change at a lower rate. For example, a millimeter-wave radar sensor that is not mobile and is placed in an indoor environment (such as at the ceiling of a room) may not experience fast changes in the TX-RX crosstalk (for example, changes due to temperature may have a slow time constant). Thus, some embodiments may advantageously save computational power by using a slow rate of TX-RX crosstalk estimation without substantially impacting the TX-RX crosstalk cancellation performance. In some embodiments, the TX-RX crosstalk cancellation (e.g., step 628) may be performed at a faster rate (e.g., every frame) than the rate of performing the TX-RX crosstalk estimation (e.g., step 608 and 624 (if applicable)).

In some embodiments, the TX-RX crosstalk cancellation rate may be dynamically changed. For example, in an embodiment in which millimeter-wave radar sensor 102 is implemented in a vehicle, the TX-RX crosstalk cancellation rate may be based on the speed of the vehicle. For example, when the vehicle is stopped at a red light, the TX-RX crosstalk cancellation rate may be slow (e.g., 10 times or 100 times slower than the radar frame rate). Having a slow TX-RX crosstalk cancellation rate when the vehicle is stopped may advantageously save computational power and battery power without substantially impacting the TX-RX crosstalk cancellation performance (since the environment may not change very rapidly). When the vehicle is moving at a high speed in a highway, the TX-RX crosstalk cancellation rate may be fast (e.g., at the same rate as the frame rate of the radar), which may advantageously improve the performance of the TX-RX crosstalk cancellation as the vehicle moves and turns at high speed).

Advantages of some applications include improved target detection performance for close-range targets, e.g., when compared with radars that use HPFs to address crosstalk (which may introduce a minimum range constraint). Additional advantages include the ability to cancel TX-RX crosstalk in applications for detecting static targets.

Figure 7:
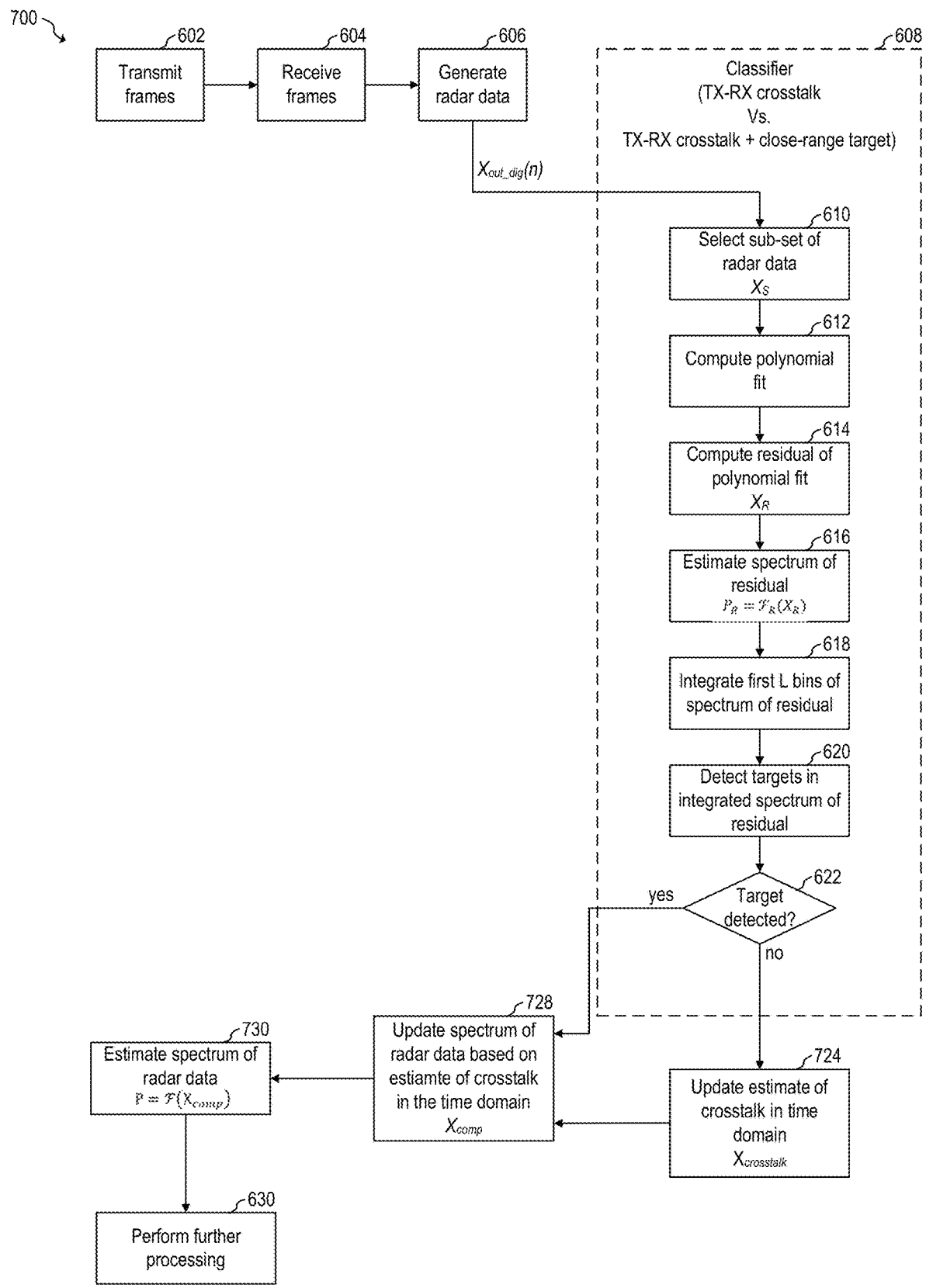

As shown in FIG. 6, the TX-RX crosstalk compensation may be performed in the frequency domain (as illustrated by step 628). In some embodiments, the TX-RX crosstalk compensation may be performed in the time domain. For example, FIG. 7, shows a flow chart of embodiment method 700 for dynamic TX-RX crosstalk cancellation, according to an embodiment of the present invention. Method 700 may be implemented by processing system 104. Method 700 is similar and may be performed in a similar manner as method 600. Method 700, however, includes steps 724 and 728 for compensating for TX-RX crosstalk in the time domain, and step 626 is performed on the compensated time-domain radar data $x_{out\_dig\_comp}(n)$ instead of on $x_{out\_dig}(n)$.

For example, during step 724 (when no target is detected in the set $X_S$ of the radar data $x_{out\_dig}(n)$), a crosstalk compensation factor $X_{crosstalk}$ is updated, where $X_{crosstalk}$ is a time domain compensation factor ($X_{crosstalk} \in \mathbb{R}^{N_S \times N_C \times N_R}$) and where the compensation factor $X_{crosstalk}$ may be previously initialized, e.g., to a default value. For example, in some embodiments, $X_{crosstalk}$ corresponds to the best fit curve generated during step 612, and which may substantially approximate the TX-RX crosstalk. Updating the crosstalk compensation factor $X_{crosstalk}$ may be performed using EMA, e.g., as $$X_{crosstalk} \leftarrow \alpha X_{crosstalk} + (1-\alpha) \mathcal{D}\left(P_d(A_{opt})\right), \quad (15)$$

where $\mathcal{D}: \mathbb{R}^{N_S \times S} \rightarrow \mathbb{R}^{N_S \times N_C \times N_R}$, $P_d(A_{opt}) \mapsto \mathcal{D}(P_d(A_{opt}))$ maps the least-squares fit $P_d(A_{opt})$ based on the selection $\mathcal{S}$ to the corresponding elements in $X_{crosstalk}$. In some embodiments, the selection $\mathcal{S}$ contains at least one chirp of each receive channel to obtain a reasonable mapping $\mathcal{D}$.

In some embodiments, the compensated radar data)(comp may be given as $$X_{comp} = X - X_{crosstalk}, \quad (16)$$

where X represents the radar data $x_{out\_dig}(n)$.

During step 730, the spectrum of the compensated radar data)(comp is performed, e.g., in a similar manner as in step 730. For example, in some embodiments, the spectrum of the compensated radar data is performed as $$P = \mathcal{F}\left(X_{comp}\right) \quad (17)$$

where $\mathcal{F}(\ )$ is the same spectral estimator used during step 616.

Advantages of some embodiment implementing the TX-RX cancellation in the time domain (e.g., method 700) include achieving TX-RX cancellation without suffering from residual side lobes of the TX-RX crosstalk.

Example embodiments of the present invention are summarized here. Other embodiments can also be understood from the entirety of the specification and the claims filed herein.

Example 1. A method including: initializing a crosstalk compensation factor indicative of a transmitter-receiver crosstalk between a transmit path of a radar sensor and a receive path of the radar sensor; receiving radar data from the radar sensor; selecting a set of data from the radar data; performing target detection on the set of data; and after performing the target detection on the set of data, when no target is detected in the set of data, updating the crosstalk compensation factor based on the set of data and, after updating the crosstalk compensation factor, generating a radar spectrum based on the radar data and the crosstalk compensation factor, and when a target is detected in the set of data, generating the radar spectrum based on the radar data and the crosstalk compensation factor without updating the crosstalk compensation factor.

Example 2. The method of example 1, further including: determining a crosstalk approximation of the transmitter-receiver crosstalk on the set of data; determining a residual of the crosstalk approximation based on the polynomial fit and the set of data; and determining a spectrum of the residual of the crosstalk approximation, where performing the target detection on the set of data includes performing the target detection on the set of data based on the spectrum of the residual of the polynomial fit.

Example 3. The method of examples 1 or 2, further including: determining a polynomial fit on the set of data; determining a residual of the polynomial fit based on the polynomial fit and the set of data; and determining a spectrum of the residual of the polynomial fit, where performing the target detection on the set of data includes performing the target detection on the set of data based on the spectrum of the residual of the polynomial fit.

Example 4. The method of one of examples 1 to 3, where determining the polynomial fit includes performing a least-squares fit of low-order polynomial on the set of data, where the low-order polynomial is a polynomial of order between 6 and 10.

Example 5. The method of one of examples 1 to 4, further including integrating a first L bins of the spectrum of the residual of the polynomial fit to generate an integrated spectrum, L being a positive integer greater than 1 and lower than or equal to a maximum number of bins of the spectrum of the residual of the polynomial fit, where performing the target detection on the set of data includes performing the target detection on the set of data based on the integrated spectrum.

Example 6. The method of one of examples 1 to 5, where integrating the first L bins of the spectrum of the residual of the polynomial fit includes incoherently integrating the first L bins of the spectrum of the residual of the polynomial fit.

Example 7. The method of one of examples 1 to 6, where generating the radar spectrum and generating the spectrum of the residual of the polynomial fit includes using the same spectral estimator.

Example 8. The method of one of examples 1 to 7, where selecting the set of data and performing the target detection on the set of data includes selecting the set of data and performing the target detection on the set of data at a same rate as a frame rate of the radar data.

Example 9. The method of one of examples 1 to 7, where selecting the set of data and performing the target detection on the set of data includes selecting the set of data and performing the target detection on the set of data at a rate lower than a frame rate of the radar data.

Example 10. The method of one of examples 1 to 7, where selecting the set of data and performing the target detection on the set of data includes selecting the set of data and performing the target detection on the set of data at a dynamic rate.

Example 11. The method of one of examples 1 to 10, further including generating the radar spectrum based on the radar data and the crosstalk compensation factor at a faster rate than performing the target detection on the set of data.

Example 12. The method of one of examples 1 to 11, where performing the target detection on the set of data includes performing the target detection on the set of data using a constant false alarm rate (CFAR).

Example 13. The method of one of examples 1 to 12, further including aborting the target detection on the set of data when a first target is detected.

Example 14. The method of one of examples 1 to 13, where updating the crosstalk compensation factor includes updating the crosstalk compensation factor using an exponential moving average.

Example 15. The method of one of examples 1 to 14, where the crosstalk compensation factor includes a crosstalk spectrum, and where generating the radar spectrum includes: generating a first radar spectrum based on the radar data; and subtracting the crosstalk spectrum from the first radar spectrum.

Example 16. The method of one of examples 1 to 14, where the crosstalk compensation factor includes a time-domain crosstalk estimate, and where generating the radar spectrum includes: subtracting the time-domain crosstalk estimate from the radar data to generate a compensated radar data; and generating the radar spectrum based on the compensated radar data.

Example 17. The method of one of examples 1 to 16, where the set of data includes a plurality of linear chirps.

Example 18. The method of one of examples 1 to 17, further including generating the radar data based on signals from the receive path of the radar sensor.

Example 19. The method of one of examples 1 to 18, further including performing target detection or target tracking based on the radar spectrum.

Example 20. The method of one of examples 1 to 19, where the radar sensor is a millimeter-wave radar sensor.

Example 21. The method of one of examples 1 to 20, where the set of data is a sub-set of radar data selected from the radar data.

Example 22. A radar system including: a radar sensor configured to transmit radar signals via a transmit path, receive reflected radar signals via a receive path, and provide radar data based on an output of the receive path; and a processing system configured to: initialize a crosstalk compensation factor indicative of a transmitter-receiver crosstalk between the transmit path and the receive path, select a set of data from the radar data, perform target detection on the set of data, and after performing the target detection on the set of data, when no target is detected in the set of data, update the crosstalk compensation factor based on the set of data and, after updating the crosstalk compensation factor, generate a radar spectrum based on the radar data and the crosstalk compensation factor, and when a target is detected in the set of data, generate the radar spectrum based on the radar data and the crosstalk compensation factor without updating the crosstalk compensation factor.

Example 23. A method including: initializing a crosstalk compensation factor indicative of a transmitter-receiver crosstalk between the a transmit path of a millimeter-wave radar sensor and a receive path of the millimeter-wave radar sensor; receiving radar data from the millimeter-wave radar sensor; selecting a sub-set of data from the radar data; determining a polynomial fit on the sub-set of data; determining a residual of the polynomial fit based on the polynomial fit and the sub-set of data; and determining a spectrum of the residual of the polynomial fit; incoherently integrating a first L bins of the spectrum of the residual of the polynomial fit to generate an integrated spectrum, L being a positive integer greater than 1 and lower than a maximum number of bins of the spectrum of the residual of the polynomial fit; performing target detection on the sub-set of data based on the integrated spectrum; after performing the target detection on the sub-set of data, when no target is detected in the sub-set of data, updating the crosstalk compensation factor based on the sub-set of data and, after updating the crosstalk compensation factor, generating a radar spectrum based on the radar data and the crosstalk compensation factor, and when a target is detected in the sub-set of data, generating the radar spectrum based on the radar data and the crosstalk compensation factor without updating the crosstalk compensation factor; and performing target detection or target tracking based on the radar spectrum.

Example 24. A method including: receiving radar data from a radar sensor; selecting a set of data from the radar data; determining a crosstalk approximation of a transmitter-receiver crosstalk between a transmit path of the radar sensor and a receive path of the radar sensor based on the set of data; determining a residual of the crosstalk approximation based on the crosstalk approximation and the set of data; determining a spectrum of the residual of the crosstalk approximation; and performing target detection on the set of data based on the spectrum of the residual of the crosstalk approximation.

Example 25. The method of example 24, where determining the crosstalk approximation includes determining a polynomial fit on the set of data, and where determining the residual of the crosstalk approximation includes subtracting the crosstalk approximation from the set of data.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   initializing a crosstalk compensation factor indicative of a transmitter-receiver crosstalk between a transmit path of a radar sensor and a receive path of the radar sensor;
   receiving radar data from the radar sensor;
   selecting a set of data from the radar data;
   performing target detection on the set of data;
   after performing the target detection on the set of data,
      when no target is detected in the set of data, updating the crosstalk compensation factor based on the set of data and, after updating the crosstalk compensation factor, generating a radar spectrum based on the radar data and the crosstalk compensation factor, and
      when a target is detected in the set of data, generating the radar spectrum based on the radar data and the crosstalk compensation factor without updating the crosstalk compensation factor;
   determining a crosstalk approximation of the transmitter-receiver crosstalk;
   determining a residual of the crosstalk approximation based on the crosstalk approximation and the set of data; and
   determining a spectrum of the residual of the crosstalk approximation, wherein performing the target detection on the set of data comprises performing the target detection on the set of data based on the spectrum of the residual of the crosstalk approximation, and the spectrum of the residual of the crosstalk approximation comprises range bins representing frequency domain values.

2. The method of claim 1, wherein determining the crosstalk approximation comprises determining a polynomial fit on the set of data, wherein determining the residual of the crosstalk approximation comprises determining a residual of the polynomial fit based on the polynomial fit and the set of data, and wherein determining the spectrum of the residual of the crosstalk approximation comprises determining a spectrum of the residual of the polynomial fit.

3. The method of claim 2, wherein determining the polynomial fit comprises performing a least-squares fit of a low-order polynomial on the set of data, wherein the low-order polynomial is a polynomial of order between 6 and 10.

4. The method of claim 2, further comprising integrating a first L bins of the spectrum of the residual of the polynomial fit to generate an integrated spectrum, L being a positive integer greater than 1 and lower than or equal to a maximum number of bins of the spectrum of the residual of the polynomial fit, wherein performing the target detection on the set of data comprises performing the target detection on the set of data based on the integrated spectrum.

5. The method of claim 4, wherein integrating the first L bins of the spectrum of the residual of the polynomial fit comprises incoherently integrating the first L bins of the spectrum of the residual of the polynomial fit.

6. The method of claim 1, wherein:
   generating the radar spectrum comprises using a spectral estimator; and
   generating the spectrum of the residual of the crosstalk approximation comprises using the spectral estimator.

7. The method of claim 1, wherein performing the target detection on the set of data comprises performing the target detection on the set of data using a constant false alarm rate (CFAR).

8. The method of claim 1, further comprising aborting the target detection on the set of data when a first target is detected.

9. The method of claim 1, wherein updating the crosstalk compensation factor comprises updating the crosstalk compensation factor using an exponential moving average.

10. The method of claim 1, wherein the crosstalk compensation factor comprises a crosstalk spectrum, and wherein generating the radar spectrum comprises:
    generating a first radar spectrum based on the radar data; and
    subtracting the crosstalk spectrum from the first radar spectrum.

11. The method of claim 1, wherein the crosstalk compensation factor comprises a time-domain crosstalk estimate, and wherein generating the radar spectrum comprises:
    subtracting the time-domain crosstalk estimate from the radar data to generate compensated radar data; and
    generating the radar spectrum based on the compensated radar data.

12. The method of claim 1, wherein the set of data comprises a plurality of linear chirps.

13. The method of claim 1, further comprising generating the radar data based on signals from the receive path of the radar sensor.

14. The method of claim 1, further comprising performing the target detection or target tracking based on the radar spectrum.

15. The method of claim 1, wherein the radar sensor is a millimeter-wave radar sensor.

16. The method of claim 1, wherein the set of data is a subset of radar data selected from the radar data.

17. The method of claim 1, wherein:
    selecting the set of data and performing the target detection on the set of data comprises selecting the set of data and performing the target detection on the set of data at a same rate as a frame rate of the radar data; or
    selecting the set of data and performing the target detection on the set of data comprises selecting the set of data and performing the target detection on the set of data at a rate lower than the frame rate of the radar data; or
    selecting the set of data and performing the target detection on the set of data comprises selecting the set of data and performing the target detection on the set of data at a dynamic rate; or
    the method further comprises generating the radar spectrum based on the radar data and the crosstalk compensation factor at a faster rate than performing the target detection on the set of data.

18. A radar system comprising:
    a radar sensor configured to transmit radar signals via a transmit path, receive reflected radar signals via a receive path, and provide radar data based on an output of the receive path; and
    at least one processor and at least one memory with instructions stored thereon, wherein the instructions, when executed by the at least one processor enable the radar system to perform the steps of:
       initializing a crosstalk compensation factor indicative of a transmitter-receiver crosstalk between the transmit path and the receive path,
       selecting a set of data from the radar data, performing target detection on the set of data, and
after performing the target detection on the set of data,
when no target is detected in the set of data, updating the crosstalk compensation factor based on the set of data and, after updating the crosstalk compensation factor, generating a radar spectrum based on the radar data and the crosstalk compensation factor, and
when a target is detected in the set of data, generating the radar spectrum based on the radar data and the crosstalk compensation factor without updating the crosstalk compensation factor;
determining a crosstalk approximation of the transmitter-receiver crosstalk; determining a residual of the crosstalk approximation based on the crosstalk approximation and the set of data; and
determining a spectrum of the residual of the crosstalk approximation, wherein performing the target detection on the set of data comprises performing the target detection on the set of data based on the spectrum of the residual of the crosstalk approximation, and the spectrum of the residual of the crosstalk approximation comprises range bins representing frequency domain values.

19. The radar system of claim 18, wherein:
selecting the set of data and performing the target detection on the set of data comprises selecting the set of data and performing the target detection on the set of data at a same rate as a frame rate of the radar data, or
selecting the set of data and performing the target detection on the set of data comprises selecting the set of data and performing the target detection on the set of data at a rate lower than the frame rate of the radar data, or
selecting the set of data and performing the target detection on the set of data comprises selecting the set of data and performing the target detection on the set of data at a dynamic rate, or
the instructions, when executed by the at least one processor further enable the radar system to perform the step of generating the radar spectrum based on the radar data and the crosstalk compensation factor at a faster rate than performing the target detection on the set of data.

20. A method comprising:
initializing a crosstalk compensation factor indicative of a transmitter-receiver crosstalk between a transmit path of a radar sensor and a receive path of the radar sensor;
receiving radar data from the radar sensor;
selecting a set of data from the radar data;
performing target detection on the set of data;
after performing the target detection on the set of data,
when no target is detected in the set of data, updating the crosstalk compensation factor based on the set of data and, after updating the crosstalk compensation factor, generating a radar spectrum based on the radar data and the crosstalk compensation factor, and
when a target is detected in the set of data, generating the radar spectrum based on the radar data and the crosstalk compensation factor without updating the crosstalk compensation factor;
determining a crosstalk approximation of the transmitter-receiver crosstalk;
determining a residual of the crosstalk approximation based on the crosstalk approximation and the set of data; and
determining a spectrum of the residual of the crosstalk approximation, wherein performing the target detection on the set of data comprises performing the target detection on the set of data based on the spectrum of the residual of the crosstalk approximation, wherein determining the crosstalk approximation comprises determining a polynomial fit on the set of data, wherein determining the residual of the crosstalk approximation comprises determining a residual of the polynomial fit based on the polynomial fit and the set of data, and wherein determining the spectrum of the residual of the crosstalk approximation comprises determining a spectrum of the residual of the polynomial fit.

21. The method of claim 20, wherein determining the polynomial fit comprises performing a least-squares fit of a low-order polynomial on the set of data, wherein the low-order polynomial is a polynomial of order between 6 and 10.

22. The method of claim 20, further comprising integrating a first L bins of the spectrum of the residual of the polynomial fit to generate an integrated spectrum, L being a positive integer greater than 1 and lower than or equal to a maximum number of bins of the spectrum of the residual of the polynomial fit, wherein performing the target detection on the set of data comprises performing the target detection on the set of data based on the integrated spectrum.

23. The method of claim 22, wherein integrating the first L bins of the spectrum of the residual of the polynomial fit comprises incoherently integrating the first L bins of the spectrum of the residual of the polynomial fit.

24. A radar system comprising:
a radar sensor configured to transmit radar signals via a transmit path, receive reflected radar signals via a receive path, and provide radar data based on an output of the receive path; and
at least one processor and at least one memory with instructions stored thereon, wherein the instructions, when executed by the at least one processor enable the radar system to perform the steps of:
initializing a crosstalk compensation factor indicative of a transmitter-receiver crosstalk between the transmit path and the receive path,
selecting a set of data from the radar data,
performing target detection on the set of data,
after performing the target detection on the set of data,
when no target is detected in the set of data, updating the crosstalk compensation factor based on the set of data and, after updating the crosstalk compensation factor, generating a radar spectrum based on the radar data and the crosstalk compensation factor, and
when a target is detected in the set of data, generating the radar spectrum based on the radar data and the crosstalk compensation factor without updating the crosstalk compensation factor,
determining a crosstalk approximation of the transmitter-receiver crosstalk;
determining a residual of the crosstalk approximation based on the crosstalk approximation and the set of data, and
determining a spectrum of the residual of the crosstalk approximation, wherein performing the target detection on the set of data comprises performing the target detection on the set of data based on the spectrum of the residual of the crosstalk approximation, wherein determining the crosstalk approximation comprises determining a polynomial fit on the set of data, wherein determining the residual of the crosstalk approximation comprises determining a residual of the polynomial fit based on the polynomial fit and the set of data, and wherein determining the spectrum of the residual of the crosstalk approximation comprises determining a spectrum of the residual of the polynomial fit.

25. The radar system of claim 24, wherein determining the polynomial fit comprises performing a least-squares fit of a low-order polynomial on the set of data, wherein the low-order polynomial is a polynomial of order between 6 and 10.

26. The radar system of claim 24, wherein the instructions, when executed by the at least one processor further enable the radar system to perform the step of integrating a first L bins of the spectrum of the residual of the polynomial fit to generate an integrated spectrum, L being a positive integer greater than 1 and lower than or equal to a maximum number of bins of the spectrum of the residual of the polynomial fit, wherein performing the target detection on the set of data comprises performing the target detection on the set of data based on the integrated spectrum.

* * * * *